United States Patent
Paz et al.

(10) Patent No.: US 11,165,106 B2
(45) Date of Patent: Nov. 2, 2021

(54) OPTICAL COMMUNICATION THROUGH TRANSPARENT POUCHES OF LITHIUM ION BATTERIES

(71) Applicant: Storedot Ltd., Herzeliya (IL)

(72) Inventors: Ron Paz, Rehovot (IL); Yaniv Damtov, Rehovot (IL); Leonid Krasovitsky, Rishon LeTzion (IL); Ohad Goldbart, Yehud (IL); Simon Litsyn, Tel Aviv (IL); Daniel Aronov, Netanya (IL)

(73) Assignee: Storedot Ltd., Herzeliya (IL)

( * ) Notice: Subject to any disclaimer, the term of this patent is extended or adjusted under 35 U.S.C. 154(b) by 0 days.

(21) Appl. No.: 16/718,235

(22) Filed: Dec. 18, 2019

(65) Prior Publication Data

US 2020/0127341 A1    Apr. 23, 2020

Related U.S. Application Data

(63) Continuation-in-part of application No. 15/912,744, filed on Mar. 6, 2018, now Pat. No. 10,818,883.
(Continued)

(51) Int. Cl.
*H01M 10/48* (2006.01)
*H01M 50/116* (2021.01)
(Continued)

(52) U.S. Cl.
CPC ....... *H01M 10/48* (2013.01); *H01M 10/0525* (2013.01); *H01M 10/425* (2013.01);
(Continued)

(58) Field of Classification Search
CPC .................................................. H01M 10/48
See application file for complete search history.

(56) References Cited

U.S. PATENT DOCUMENTS 9,406,927 B1   8/2016  Burshtain et al.
10,199,677 B2  2/2019  Drach et al.
(Continued)

FOREIGN PATENT DOCUMENTS

WO    WO 2018/109774    6/2018

OTHER PUBLICATIONS

Zhidan Zenga et al. "In situ measurement of lithiation-induced stress in silicon nanoparticles using micro-Raman spectroscopy" Nano Energy vol. 22, Apr. 2016, pp. 105-110.
(Continued)

*Primary Examiner* — Brian R Ohara
(74) *Attorney, Agent, or Firm* — Reches Patent

(57) ABSTRACT

Lithium ion batteries and cells, as well as operating and testing methods are provided, which utilize a transparent pouch to monitor the battery in operational condition and/or in operation. Transparent parts of the pouch may be used for direct sensing of cell elements. Removable covers may be used to protect battery components from illumination damage. Indicators in the transparent pouch may be associated with cell components such as electrodes and electrolyte to indicate their condition. External sensors may be used to derive data from the indicators, and bi-directional electromagnetic (e.g., optical) communication may be established through the transparent pouch, to enhance monitoring and spare physical electrical connections. For example, the transparent pouch may be used to monitor and enhance battery safety and/or to modify operational parameters non-destructively, during operation of the battery.

11 Claims, 7 Drawing Sheets

Related U.S. Application Data

(60) Provisional application No. 62/467,261, filed on Mar. 6, 2017.

(51) Int. Cl.
    *H01M 10/0525* (2010.01)
    *H01M 10/42* (2006.01)
    *H01M 50/131* (2021.01)

(52) U.S. Cl.
    CPC ........ *H01M 50/116* (2021.01); *H01M 50/131* (2021.01); *H01M 2010/4271* (2013.01)

(56) References Cited

U.S. PATENT DOCUMENTS

| | | | | |
|---|---|---|---|---|
| 10,312,555 | B2* | 6/2019 | Fukuda | ............... H01M 50/578 |
| 2003/0099885 | A1* | 5/2003 | Kim | ..................... H01M 4/742 |
| | | | | 429/241 |
| 2004/0257037 | A1* | 12/2004 | Hartung | ................ H01M 10/46 |
| | | | | 320/114 |
| 2006/0267544 | A1* | 11/2006 | Montvay | .............. H01M 50/116 |
| | | | | 320/106 |
| 2009/0111008 | A1 | 4/2009 | Wen | |
| 2014/0136132 | A1 | 5/2014 | Maekawa et al. | |
| 2015/0022159 | A1* | 1/2015 | Perichon | .......... H01M 10/4235 |
| | | | | 320/136 |
| 2015/0044532 | A1 | 2/2015 | Hsiao | |
| 2017/0294687 | A1 | 10/2017 | Burshtain et al. | |
| 2019/0036122 | A1* | 1/2019 | Iordache | ............. H01M 10/052 |
| 2019/0148774 | A1 | 5/2019 | Kuks et al. | |
| 2019/0198912 | A1 | 6/2019 | Sella et al. | |

OTHER PUBLICATIONS

Office Action for U.S. Appl. No. 15/912,744, dated Aug. 16, 2019.
Office Action for U.S. Appl. No. 15/912,744, dated Oct. 8, 2019.

* cited by examiner

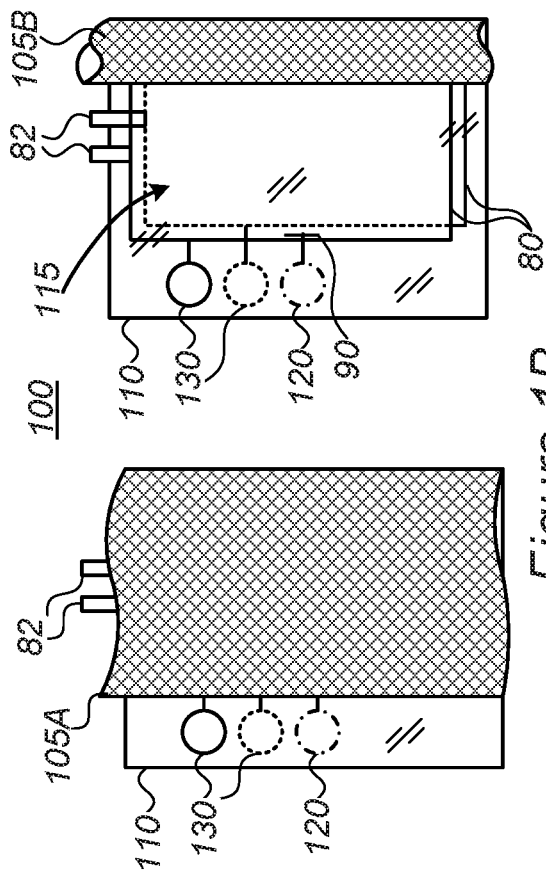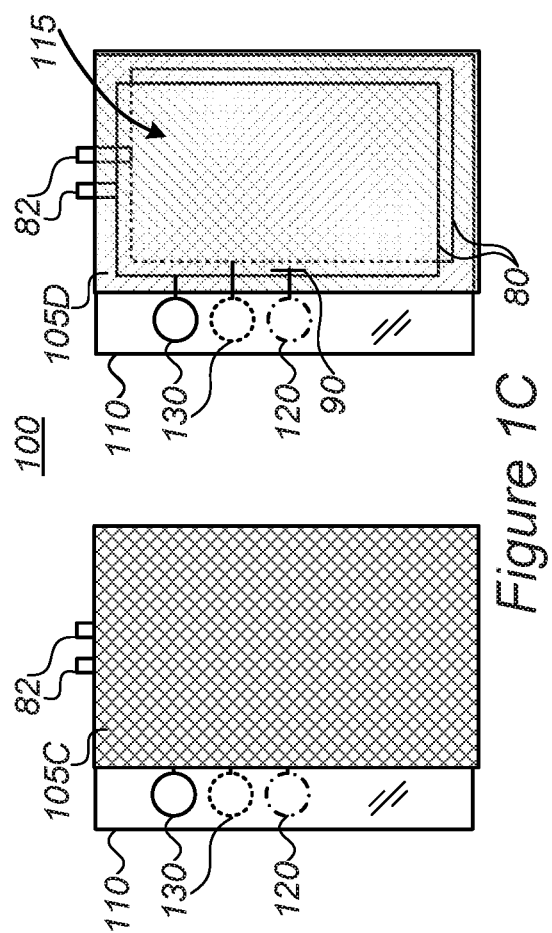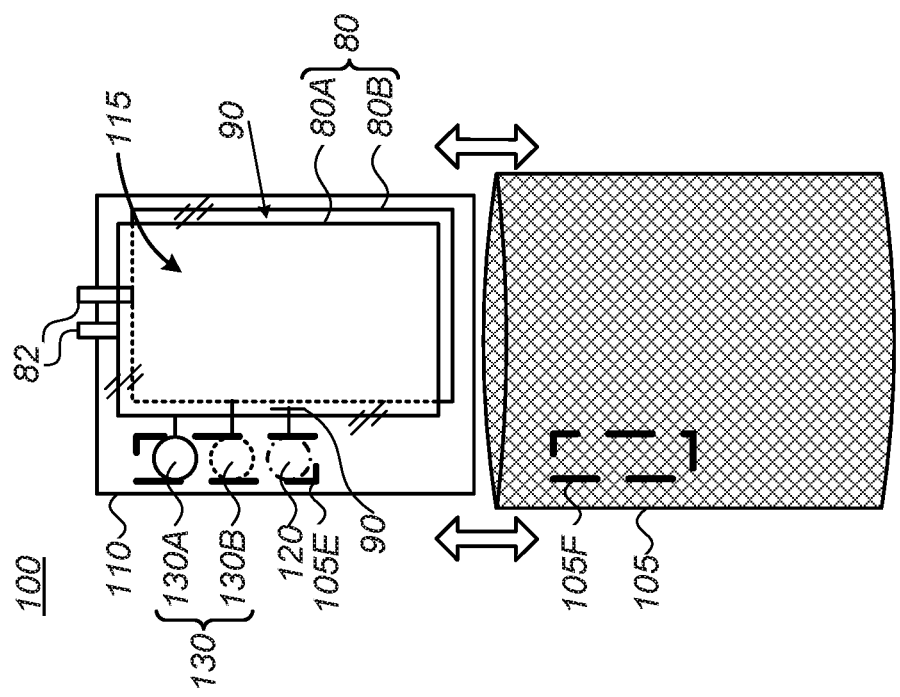
Figure 1B
Figure 1C
Figure 1A

200

210 — Enclosing lithium ion cell(s) of a lithium ion battery in a transparent pouch configured to maintain the lithium ion battery operative 220 — Monitoring the lithium ion battery in its operative condition, during operation and/or testing 222 — Monitoring the lithium ion battery in its operative condition by electromagnetic sensing of electromagnetic indications associated with cell components 225 — Managing operation of the lithium ion battery using the sensed electromagnetic indications 230 — Covering, opaquely, the lithium ion battery during operation and exposing the battery, at least partly, during monitoring, while maintaining the lithium ion battery operative 232 — Covering the transparent pouch by an opaque cover while leaving at least one electromagnetic indicator in an uncovered window or tab of the transparent pouch 240 — Associating electromagnetic indicator(s) with cell component(s) inside the transparent pouch 245 — Configuring the electromagnetic indicator(s) to indicate a condition of the respective cell component(s)

247 — Sensing cell parameters directly, through the transparent pouch

*Figure 3*

OPTICAL COMMUNICATION THROUGH TRANSPARENT POUCHES OF LITHIUM ION BATTERIES

CROSS REFERENCE TO RELATED APPLICATIONS

This application is a continuation-in-part of U.S. patent application Ser. No. 15/912,744, filed Mar. 6, 2018, which claims the benefit of U.S. Provisional Patent Application No. 62/467,261, filed on Mar. 6, 2017, all of which are hereby incorporated by reference in their entirety.

BACKGROUND OF THE INVENTION

1. TECHNICAL FIELD

The present invention relates to the field of lithium ion batteries, and more particularly, to monitoring lithium ion batteries.

2. DISCUSSION OF RELATED ART

Expanding use of lithium ion batteries raises the need for reliable ways to monitor battery operation as well as advanced testing methods for improved batteries.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a lithium ion battery comprising: at least one lithium ion cell comprising at least one anode and at least one cathode, separated by at least one separator, a transparent pouch that encloses the at least one lithium ion cell with electrolyte in an operative condition, wherein the pouch is at least partly transparent within at least one range of electromagnetic radiation, at least one electromagnetic sensor outside the transparent pouch, configured to apply direct sensing through the transparent pouch—to receive data concerning a condition of at least one cell component, and a battery management system (BMS) configured to manage operation of the lithium ion battery and be in communication with the at least one electromagnetic sensor.

One aspect of the present invention provides a method comprising: enclosing at least one lithium ion cell of a lithium ion battery in a transparent pouch configured to maintain an operative condition of the lithium ion battery, wherein the pouch is at least partly transparent within at least one range of electromagnetic radiation, monitoring the lithium ion battery in the operative condition thereof by electromagnetic sensing of electromagnetic indications associated with cell components, and managing operation of the lithium ion battery using the sensed electromagnetic indications.

One aspect of the present invention provides a lithium ion battery comprising: at least one lithium ion cell comprising at least one anode and at least one cathode, separated by at least one separator, a transparent pouch that encloses the at least one lithium ion cell with electrolyte in an operative condition, wherein the pouch is at least partly transparent within at least one range of electromagnetic radiation, at least one indicator associated with at least one cell component inside the transparent pouch and configured to indicate a condition of the respective at least one cell component by an electromagnetic signal, at least one sensor outside the transparent pouch, configured to receive the electromagnetic signal from the at least one indicator, and a battery management system (BMS) configured to manage operation of the lithium ion battery and be in communication with the at least one electromagnetic sensor.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A-1F are high level schematic illustration of lithium ion batteries, according to some embodiments of the invention.

DETAILED DESCRIPTION OF THE INVENTION

Figure 1D:
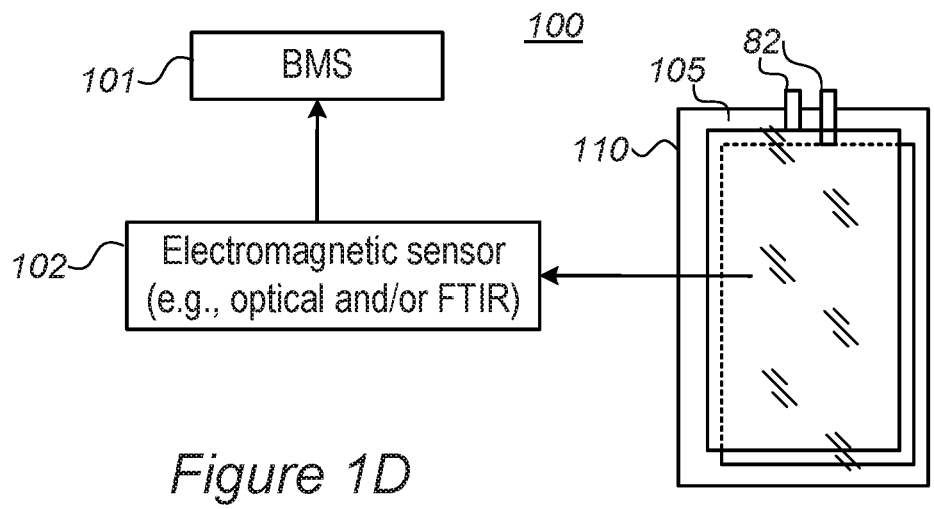

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Lithium ion batteries and cells, as well as operating and testing methods are provided, which utilize a transparent pouch to monitor the battery in operational condition and/or in operation. Transparent parts of the pouch may be used for direct sensing of cell elements. Covers may be used to prevent illumination of battery components when testing is not required, and the covers may be removed or have modifiable transparency configured to enable electromagnetic (e.g., optical) monitoring. Indicators in the transparent pouch may be associated (directly or indirectly) with cell components such as electrodes and electrolyte to indicate their condition. External sensors may be used to derive data from the indicators and/or directly from the cell and/or from cell components such as the electrodes, electrolyte solution, separators, etc., in the cell. Moreover, external sensors may be used to establish bi-directional electromagnetic (e.g., optical) communication through the transparent pouch, to enhance monitoring and spare physical electrical connections. For example, the transparent pouch may be used to monitor and enhance battery safety, prevent and/or detect lithium metallization on the anode, monitor battery lifetime and/or to modify operational parameters non-destructively, during operation of the battery. It is noted that the term "transparent" is used herein to designate materials which allow radiation in certain spectral ranges to pass at least partially therethrough, such as materials that are transparent at least over a part of the visual spectrum. In certain embodiments, the materials and structure of transparent pouch may be selected to enable sensing in specified wavelength range(s), e.g., the transparent pouch may be configured to pass some, most or all radiation within specified wavelength range(s) that are used for the direct sensing. Specified wavelength range(s) may include one or more bands in any of the optical range, infrared, ultraviolet, x-ray or possibly relate to particle beams within specified energy ranges (e.g., electron beams). Electromagnetic radiation is referred to herein as including any range(s) of the electromagnetic spectrum above a wavelength of ca. 0.01 nm (e.g., for X rays) and below a wavelength of ca. 1 mm (e.g., for infrared radiation). The term "optical" is used herein in a broad sense, to refer to any range(s) of the electromagnetic spectrum above a wavelength of ca. 1 nm and below a wavelength of ca. 1 mm, including e.g., at least parts of the ultraviolet radiation range between 10-400 nm, visible spectrum between ca. 400-700 nm and/or infrared spectrum between 700 nm and 1 mm. The term electromagnetic radiation includes optical radiation.

Any of the disclosed electromagnetic sensors, indicators and transmitters may operate in at least part of the visible, infrared or ultraviolet ranges, as well as in shorter or longer wavelength ranges.

FIGS. 1A-1F are high level schematic illustration of lithium ion batteries 100, according to some embodiments of the invention. Lithium ion battery 100 comprises a transparent pouch 110 which encloses at least one lithium ion cell 115 in an operative condition. Transparent pouch 110 is configured to enable operation of lithium ion battery 100 without substantial damage and monitoring of the condition of cell(s) 115 and their components (e.g., electrodes 80, e.g. anode(s) 80A and cathode(s) 80B, electrolyte 90 and possibly additional components such as separator and current collector layers (not illustrated), and contacts 82)—while maintaining lithium ion battery 100 operative. In certain embodiments, pouch 110 may comprise a transparent part, such as one or more windows within the otherwise opaque pouch (see, e.g., FIGS. 1A and 2E). In the following the term transparent pouch is used to refer to either of these options.

Figure 4:
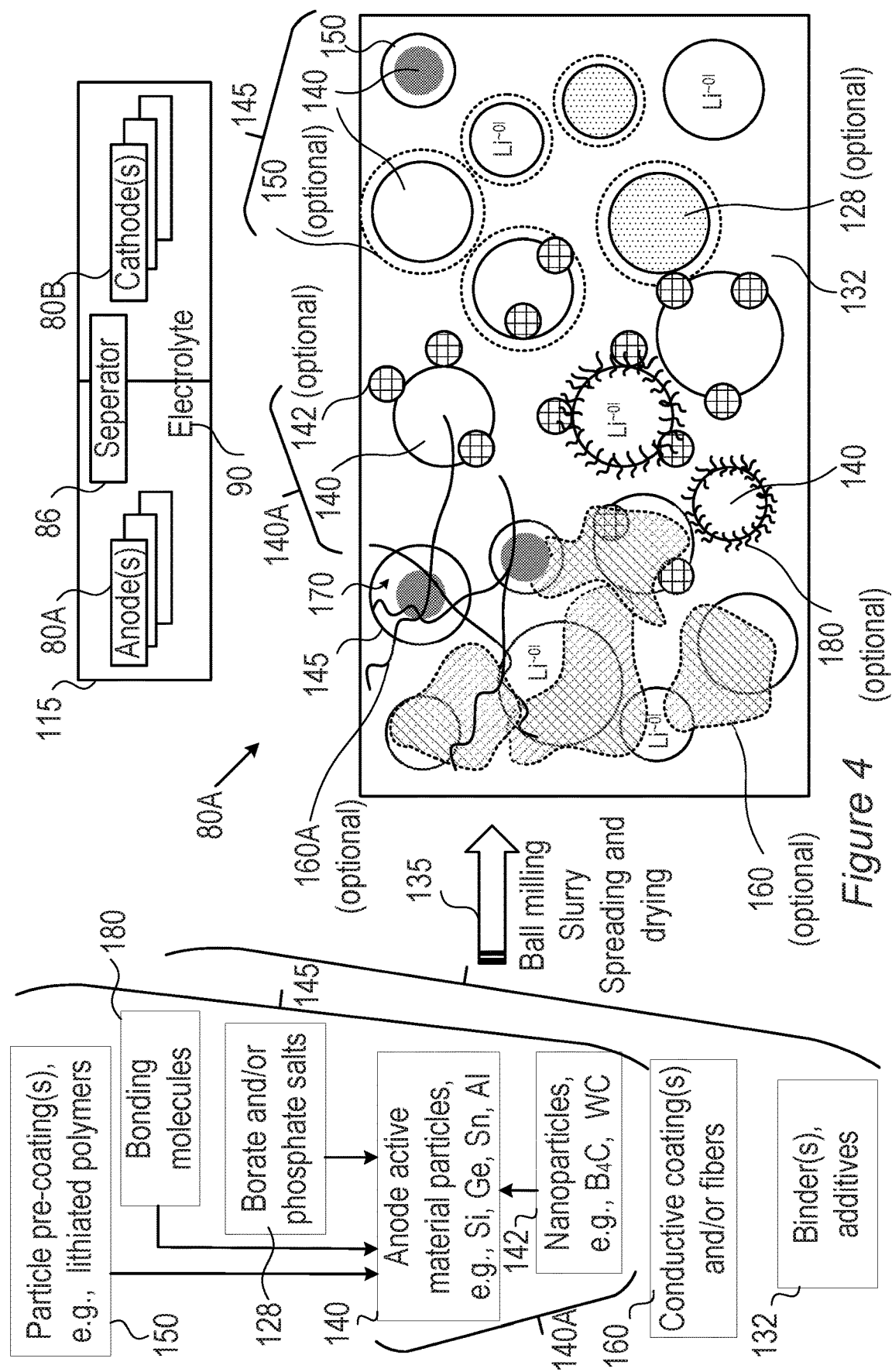
FIG. 4 is a high-level schematic illustration of various anode configurations, according to some embodiments of the invention.

Lithium ion battery 100 with transparent pouch 110 may be used in cell development processes to provide a simple and non-destructive way of monitoring cells 115 and/or during industrial production and during consumer use of batteries 100 for monitoring the operability and/or safety of batteries 100. For example, transparent pouch 110 may be used with cells 115 comprising anode(s) 80A comprising Si, Ge and/or Sn active material, as exemplified below (FIG. 4). Transparent pouch 110 may also be used with cells 115 comprising anode(s) 80A comprising graphite or other carbon-based materials.

In certain embodiments, lithium ion battery 100 further comprises an at least partly removable opaque cover 105, possibly at least partly attached to transparent pouch 110 and/or covering transparent parts 110 of an otherwise opaque pouch. FIG. 1A illustrates schematically removable cover 105, FIG. 1B illustrates schematically cover 105 which is partly attached to transparent pouch 110 (or to other external elements of battery 100), e.g., at one of its sides, and FIG. 1C illustrates schematically cover 105 which has changeable transparency (e.g., at one or more wavelength ranges as defined above), e.g., made at least partly of electrochromic material, has an at least partly opaque removable part etc. Removable cover 105 is shown in FIG. 1B in two non-limiting configurations and/or states, cover 105A exposing only a part of transparent pouch 110 which includes indicators 120, 130 (and possibly electrolyte 90—not shown in the figure) and cover 105B further exposing parts of transparent pouch 110 having cell components such as electrodes 80 and electrolyte 90. In certain embodiments, the exposure can be of a window, as described in the following.

In certain embodiments, cover 105A may comprise a window 105F (illustrated schematically in FIG. 1A in a non-limiting manner, and applicable to various embodiments of the cover and positions of indicators 120, 130) over indicators 120, 130, and/or cover 105B may expose a window over indicators 120, 130. In various embodiments, the window may be made of various materials, e.g., quartz, KBr (potassium bromide) to enable accurate measurements, e.g., of the electrolyte.

Removable cover 105 may be configured to have several states allowing different extents of exposure. Removable cover 105 is shown in FIG. 1C in two non-limiting configurations and/or states of transparency, cover state 105C being more opaque than cover state 105D. It is emphasized that at least one part of cover 105 may have at least two degrees of transparency. Multiple parts of changeable transparency and/or multiple degrees of transparency provide various embodiments of the invention.

In certain embodiments, transparent pouch 110 may be at least partly transparent within at least one range of electromagnetic radiation. For example, transparent pouch 110 may be at least partly transparent only within a specified window region 105E (see FIG. 1A) thereof that covers at least one of indicators 120, 130. Transparent pouch with only transparent window 105E may be used with or without cover 105, or possibly cover 105 may be configured to be applied only to window region 105E, e.g., to protect the cell from electromagnetic damage. Specifically, transparent pouch 110 illustrated schematically in FIG. 1A may be used without cover 105 as well, with indicators 120, 130 operating through window 105E.

Battery 100 may comprise indicators 120, 130 within transparent pouch 110 such as indicator(s) 130 connected to electrodes 80 (e.g., indicator 130A connected to electrode 80A and indicator 130B connected to electrode 80B) and/or indicator(s) 120 associated with electrolyte 90. In certain embodiments, battery 100 may comprise indicator(s) 124 that are not necessarily localized, and/or are not necessarily directly connected to cell element(s), such as chemical color indicator(s) for any of, e.g., pressure, gas, or certain chemicals within pouch 110, or possibly be associated with cell elements without direct connections, e.g., chemically. Any of indicators 120, 124, 130 may be configured to indicate a condition of corresponding electrolyte 90 and electrodes 80, possibly to enable exposure of only a small part of transparent pouch 110 (see e.g., left parts of FIGS. 1B and 1C) and minimize illumination damage to cell components such as electrolyte 90.

In certain embodiments, indicators 120, 124, 130 may comprise materials having electromagnetic (e.g., optical) features that change with changing conditions within pouch 110. For example, indicators 120, 124, 130 may comprise materials that change any of their characteristics, such as color, material phase, haziness, roughness, material amount (e.g., geometrical parameters, shape, e.g., in case of pre-lithiation) etc.—with changing parameters of the cell, such as temperatures and/or pH in pouch 110, occurrence of chemical reactions in the cell (e.g., in the electrolyte, reactions on the electrode that cause electrode color, etc.), pressure in pouch 110 and so forth.

In certain embodiments, any of indicators 120, 124, 130 may comprise special indicators or actuators that react with specified components in the cell. For example, such reactions may comprise coating and/or decorating of components such as electrodes or parts thereof, as well as etching and/or bleaching of parts of the electrodes, and possibly reactions that form bubbles, colloids, particulates etc., that may be identified and indicated. The reactions of the specified indicators may be carried out under participation of various compounds in the cell and possibly depending on their concentration, such as HF, water, different gases, lithium, Li salt concentration etc. Signals from indicators 120, 124, 130 that related to such reactions may therefore provide control over parameters of cell performance and behavior, such as cycle life, lithiation, including pre-lithiation, degradation mechanism etc.

FIG. 1D illustrates schematically transparent pouch 110 with direct optical or electromagnetic measurements, according to some embodiments of the invention. One or more electromagnetic sensor(s) 102 may be configured to to apply direct sensing through transparent pouch 110 - to receive data concerning a condition of at least one cell component (e.g., one or more anodes, one or more cathodes, electrolyte, etc.). Non-limiting examples for direct sensing, which may be implemented by one or more sensor(s) 102, comprise any of FTIR (Fourier-transform infrared spectroscopy), cameras using CCD (charge-coupled device), CMOS (complementary metal-oxide-semiconductor) or other technologies, optical microscopy, confocal microscopy, interferometry, ellipsometry, holography, speckle and Moire techniques, as well as various technologies implementing optical fibers, possibly with enhanced resolution. Corresponding sensor(s) 102 may be applied to any part of transparent pouch 110 to sense therethrough and derive corresponding data, which can then be used to derive various operation characteristics of battery 100 and/or cell 115 (see also FIGS. 2D-2F below). Direct electromagnetic sensors 102 may be used in addition to other electromagnetic sensors 102 that are associated with electromagnetic indicators 120, 130. The materials and structure of transparent pouch 110 may be selected to enable direct sensing in specified wavelength range(s), e.g., transparent pouch 110 may be configured to pass some, most or all radiation within specified wavelength range(s) that are used for the direct sensing.

Non-limiting examples for wavelength ranges in which sensing and/or communication may be carried out, and in which transparent pouch 110 may be correspondingly at least partly transparent, comprise: (i) The visible range or parts thereof may be used to provide direct optical observation, with transparent pouch 110 being made of any kind of optically transparent plastic, glass, or other at least partly transparent materials. (ii) X-ray measurements may be used, with transparent pouch 110 being made of or comprise materials transparent to X rays, such as beryllium transmission windows, or possibly even a thin metal layer. (iii) FTIR-related measurements may be used, with transparent pouch 110 and/or window thereof being made of infrared-transparent materials such as potassium bromide or sodium chloride.

It is noted that throughout the disclosure, the term transparent is used to mean at least partly transparent materials in the relevant range of the spectrum. Specifically, transparent pouch 110 may be selected to not absorb electromagnetic radiation in at least part of the ranges in which materials inside the battery emit electromagnetic radiation that can be used to derive relevant information. For example, transparent pouch 110 may be selected to have at least one spectral region in which battery components emit electromagnetic radiation and transparent pouch 110 does not absorb (or only partly absorbs) electromagnetic radiation.

In various embodiments with direct sensing, indicators 120, 124, 130 may be redundant and not required. In other embodiments, indicators 120, 124, 130 may be added to enhance, complement or backup direct sensing. It is further noted that removable cover 105 may be transparent or opaque in the specified wavelength (or particle energy) range(s), depending on the sensing method, sensitivity of battery components to operation at the specified ranges and logistics of removing the cover for taking measurements.

Figure 1E:
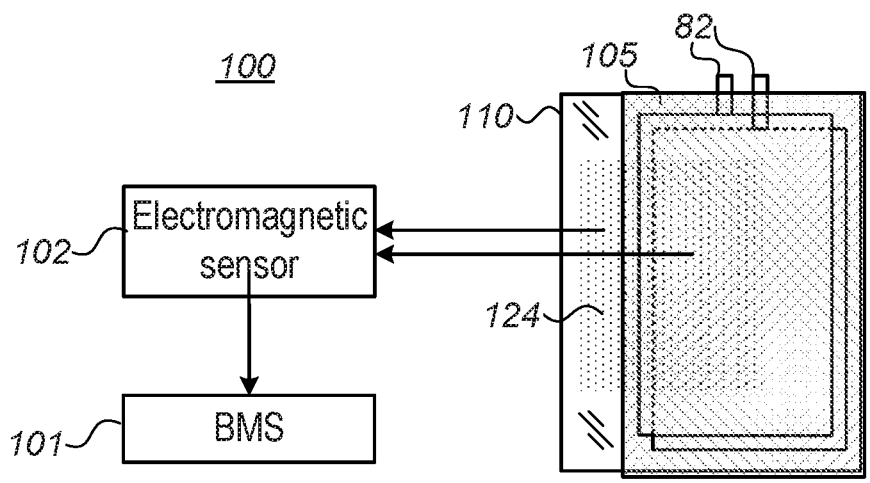

FIG. 1E illustrates schematically transparent pouch 110 with indicator(s) 124 that are not necessarily localized, and/or are not necessarily directly connected to cell element(s), such as chemical color indicator(s) for any of, e.g., pressure, gas, or certain chemicals within pouch 110, according to some embodiments of the invention. Indicator(s) 124 may comprise, e.g., electrolyte additives that change color upon certain chemical or physical interactions. Color changes in indicator(s) 124 may be sensed by electromagnetic (e.g., optical) sensor(s) 102 and communicated to BMS 101. Non-limiting examples for changes that indicator(s) 124 may be configured to indicate comprise any of: material phases (e.g., related to reactions in the electrolyte and/or upon electrodes), haze (e.g., due to release of particles into the electrolyte or formation of particles therein), roughness, material amount (e.g., geometry, shape in case of pre-lithiation) with changing temperatures, or other conditions such as pH, chemical reaction (electrolyte or/and electrode color), pressure in pouch 110, etc. BMS 101 may be configured to use signals that relate to the reactions listed above—to provide control over parameters of cell performance and behavior, such as cycle life, lithiation, including pre-lithiation, degradation mechanism etc.

Figure 1F:
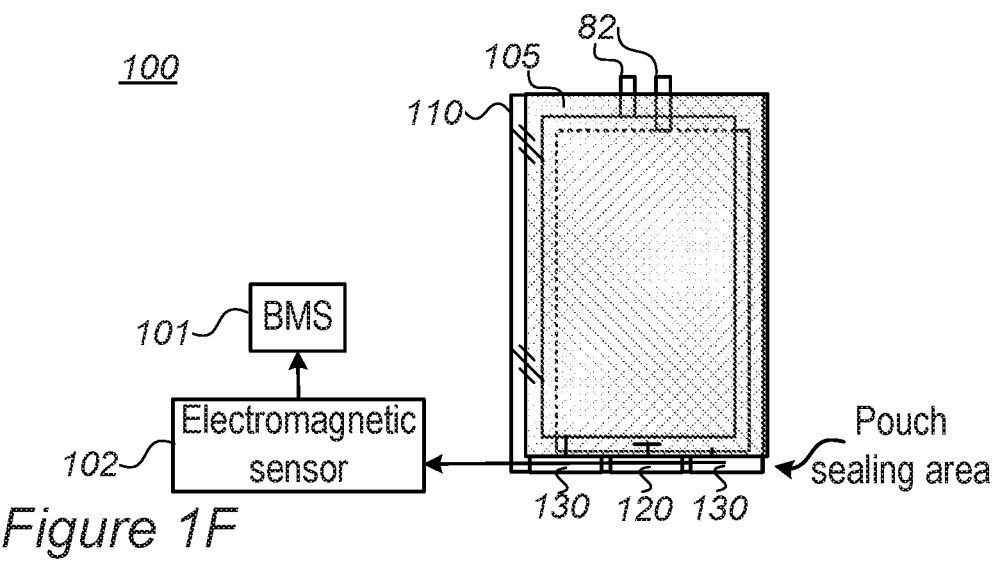

FIG. 1F illustrates schematically transparent pouch 110 with indicator(s) 120 and/or 130 that are set at one or more pouch sealing areas on the pouch periphery, according to some embodiments of the invention.

Any of indicators 120, 130, 124 may comprise special indicators that react with defined components in cells 115, such as HF, water, different gases, lithium, Li salt concentration etc., and/or with relation to processes occurring in cells 115, such as coating or/and decorating, etching and/or bleaching, etc. Indicator(s) 124 may comprise phenomena that are related to the interactions, such as bubbles or particles. BMS 101 may be configured to derive, from sensed data from any of indicators 120, 130, 124, data relating to and/or promoting control over cell performance and behavior, such as cycle life, lithiation, including the pre-lithiation, degradation mechanism(s) etc.

Transparent pouch 110 may be made of materials that withstand the operation conditions of battery 100, e.g., withstand contact with electrolyte 90. Transparent pouch 110 may be made of at least one transparent polymer, at least one electrochromic material and/or at least one partly absorptive material. Electrolyte 90 may comprise one or more electrolyte or electrolyte components, any of which may be selected to be at least partly stable under illumination passing through transparent pouch 110.

Figure 2A:
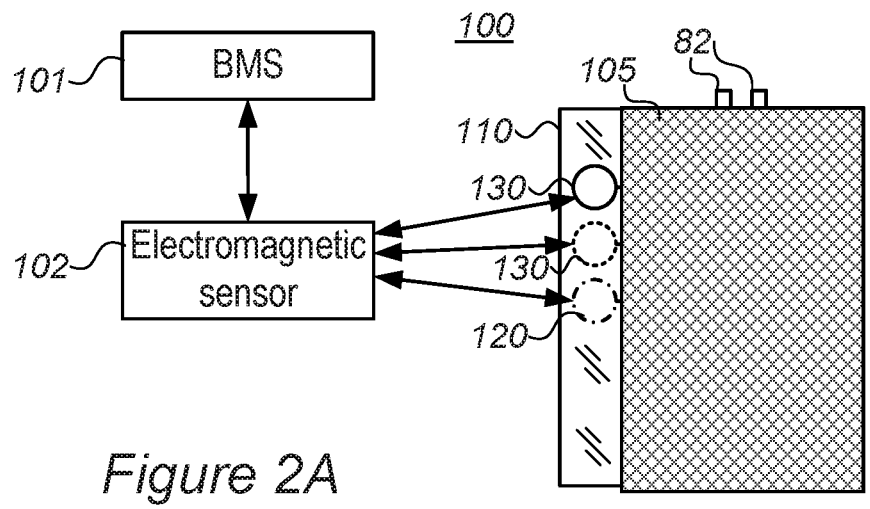
FIGS. 2A-2C are high level schematic illustrations of electromagnetic communication with elements of batteries, according to some embodiments of the invention.
Figure 2B:
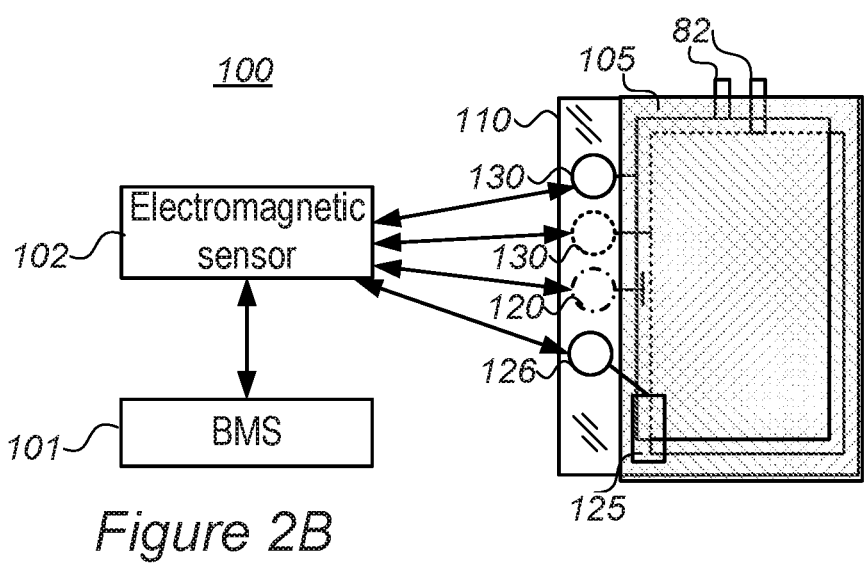
Figure 2C:
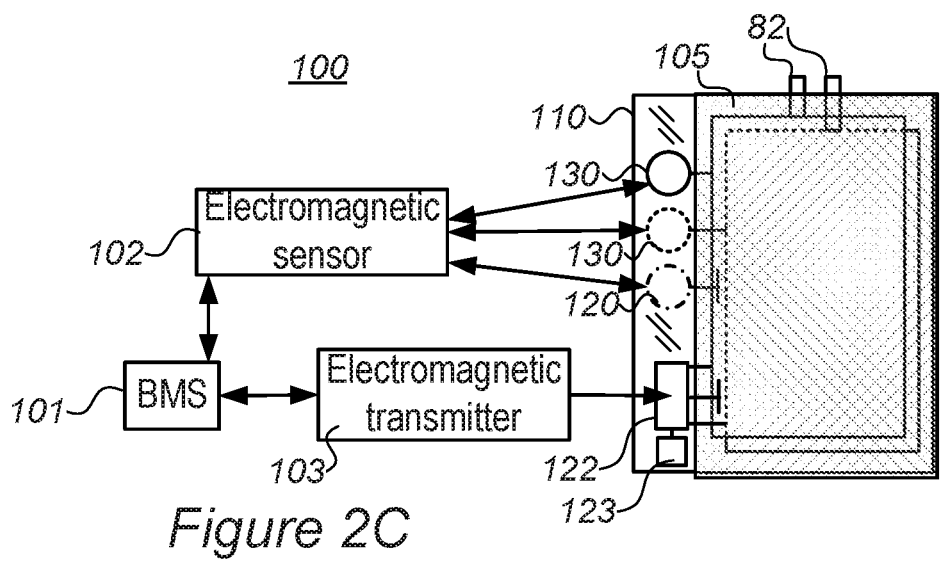

FIGS. 2A-2C are high level schematic illustrations of electromagnetic communication (optical and/or via electromagnetic radiation at other wavelengths) with elements of batteries 100, according to some embodiments of the invention. In certain embodiments, indicators 120, 130 may be used to provide information about battery 100 to a battery management system (BMS) 101. For example, one or more electromagnetic sensors 102 may be used to sense characteristics of indicators 120, 130 (e.g., change of color thereof), and communicate the changes to BMS 101 (see e.g., schematic illustration in FIG. 2A). Data concerning any of electrodes 80 and/or electrolyte 90 and/or operational parameters of battery 100 may be provided via indicators 120, 130 to electromagnetic sensor(s) 102 and BMS 101, possibly simplifying monitoring battery 100 during formation stages thereof and/or during operation thereof, e.g., by replacing or enhancing information derived from electrical parameters of battery operation. In various embodiments, electromagnetic (e.g., optical) communication achieved through using indicator(s) 120, 130 and sensor(s) 102 may advantageously spare physical contacts to battery elements, simplifying monitoring, enhance information received by other means and/or provide data that may otherwise be hard to measure, especially during battery operation, in a non-destructive manner (e.g., metallization).

In certain embodiments, at least one indicator 120, 130 may be set in a covered portion of transparent pouch 110, such as a window or a tab, to allow electromagnetic (e.g., optical) sensing thereof without exposing battery 100 or parts thereof.

In certain embodiments, illustrated schematically in FIG. 2B, additional sensor(s) 125 may be included within transparent pouch 110, and be used to provide information over characteristics of battery 100 during its operation, possibly in association with one or more indicator(s) 126, or directly. For example, sensor(s) 125 may comprise piezoelectric sensor(s), set and configured to indicate pressures within cell 115, e.g., due to mechanical expansion and contraction of anode(s) 80A. Piezoelectric sensor(s) 125 may be associated, e.g., with LED(s) 126 to indicate the sensed pressures. Sensor(s) 125 may be set at various, single or multiple positions within pouch 110, e.g., between electrodes 80, between electrodes 80 and pouch 110 and/or at one or more pouch sealing areas on the pouch periphery.

In certain embodiments, illustrated schematically in FIG. 2C, BMS 101 may be configured to deliver signals into cell 115, e.g., via an electromagnetic transmitter 103 (e.g., optical and/or electromagnetic radiation at other wavelengths) and respective electromagnetic signals sensed by a sensor 122 within transparent pouch 110. Sensor 122 may be associate with any of the cell elements (illustrated schematically) within transparent pouch 110 and possibly with respective actuator(s) (not shown). In certain embodiments, sensor 122 may be configured to receive information from the outside of battery 100, such as from BMS 101, and modify the operation of battery 100. For example, sensor 122 may be associated with actuator(s) 123 within transparent pouch 110 (illustrated schematically, in a non-limiting manner) that may be configured to release or absorb ions, possibly enhance or reduce lithiation of anode(s) 80A, cathode(s) 80B and/or electrolyte 90, release other compounds into electrolyte 90, e.g., to modify the operation conditions of cell 115, or to modify the electrical operation of cell 115, e.g., disconnect or impede operation thereof upon detected hazardous conditions. In particular, actuator(s) 123 may be configured to handle and prevent any safety issues that may occur, e.g., as a result of undesired reactions or/and release of ions. Actuator(s) 123 may be configured to counter safety issues, upon corresponding indications through electromagnetic (e.g., optical) transmitter 103. In certain embodiments, using both electromagnetic sensor(s) 120, 130 and electromagnetic transmitter(s) 103 and sensor(s) 122, the battery may implement bi-directional communication between cell(s) 115 and BMS 101, enabling more effective control of battery operation. Possibly with fewer physical electrical connections and/or with respect to more operational parameters and conditions.

Figure 2D:
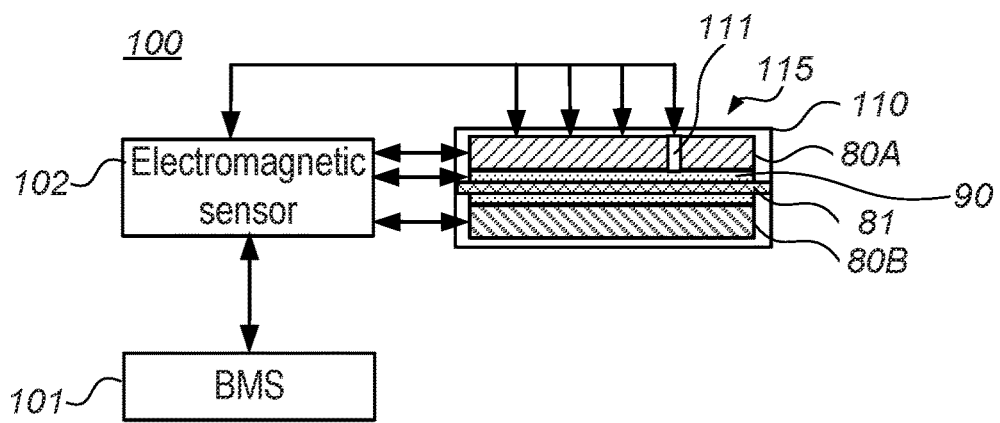
FIGS. 2D-2F are high level schematic illustrations of direct sensing of elements of batteries, according to some embodiments of the invention
Figure 2E:
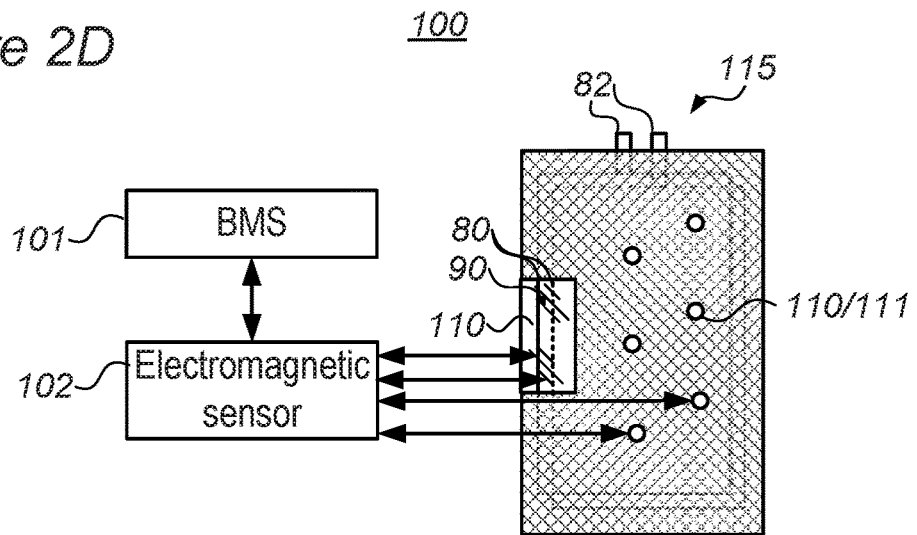
Figure 2F:
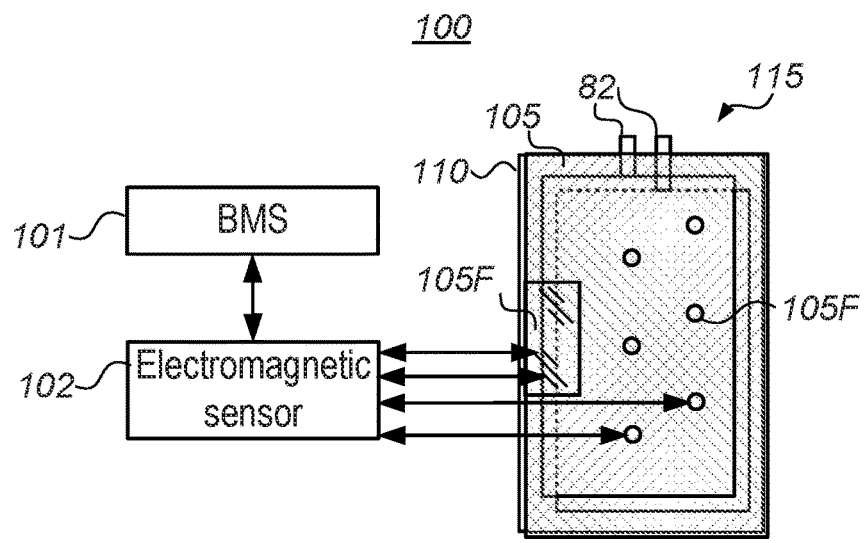

FIGS. 2D-2F are high level schematic illustrations of direct sensing of elements of batteries 100, according to some embodiments of the invention. Any of the disclosed embodiments may be applied on its own, or in addition to any one of the embodiments disclosed herein, and illustrated, e.g., in other figures. FIG. 2D illustrates in schematic cross section side view of cell 115, including cell elements and components such as anode(s) 80A, cathode(s) 80B (collectively—electrodes 80), electrolyte 90, separator(s) 81, etc., the application of direct electromagnetic sensor(s) 102, e.g., FTIR or ellipsometry sensor(s), directly to corresponding cell components. In various embodiments, such methods may be implemented to directly measure cell components and/or the electrolyte solution, deriving parameters such as compositions and dimensions of the respective cell components (e.g., electrode thickness and/or composition relating to electrochemical processes, electrolyte composition, etc.). In various embodiments, transparent pouch 110 may comprise see-through holes to the surface of one or more electrodes 80 (anode(s) 80A and/or cathode(s) 80B). In certain embodiments, holes 111 may pass through one or more electrodes 80 (possibly associated with transparent sections of separator(s) 81) to enable monitoring underlying electrodes 80 and enable direct sensing of internal cell components, e.g., in cased of rolled electrodes forming multiple layers of electrodes. In certain embodiments, continuous measured path(s) for delivering and receiving optical or other electromagnetic radiation may be formed by the see-through holes that are part of transparent pouch 110 and by holes 111 in electrode(s) 80.

FIGS. 2E and 2F further illustrate direct measurements through a transparent pouch part 110 (illustrated schematically) and through a transparent window 105F in cover 105, respectively, both cases implementing direct measurement of cell components (without using indicators 120, 130). Any of the direct measurement methods disclosed herein may be implemented in electromagnetic sensor(s) 102. In certain embodiments, transparent pouch parts 110 and/or transparent windows 105F may comprise a plurality of transparent holes (illustrated schematically in FIGS. 2D-2E), allowing to perform absorbance and/or transmittance tests of cell components. In certain embodiments, holes 111 in electrodes 80 may be continuous to the transparent holes—providing measurement paths into the inner electrodes in case of cells having multiple electrode layers. The transparent holes may be configured to maintain a clear path between the wave source and the detector of sensor 102, in the relevant wavelength range. The transparent holes may be positioned with respect to one or more components, such as one or more anodes, cathodes and/or separators in the cell to allow measuring them. In certain embodiments, the plurality of holes may allow averaging the measurements to correspond, e.g., to the whole electrode surface.

Figure 3:
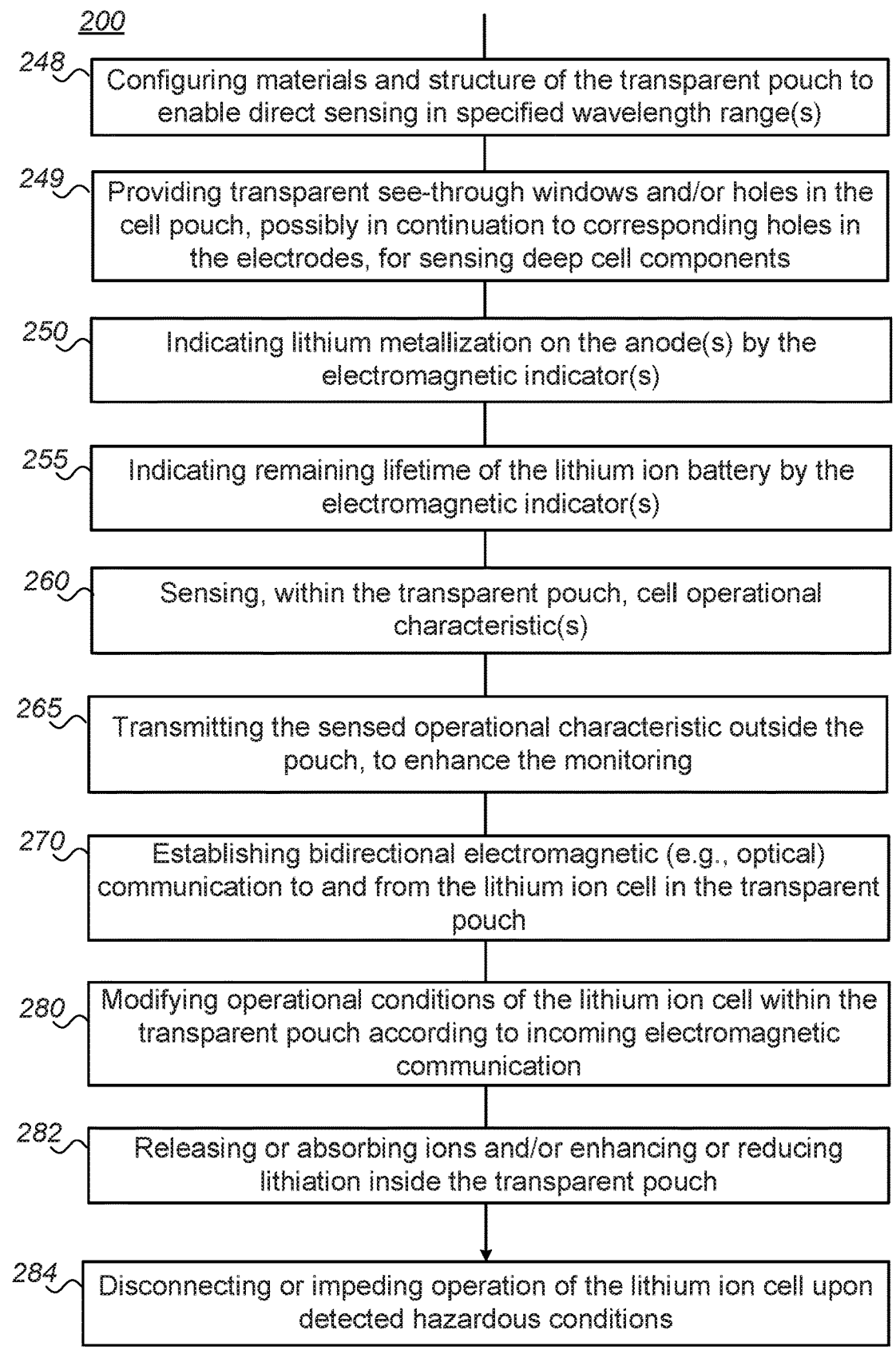
FIG. 3 is a high-level flowchart illustrating a method, according to some embodiments of the invention.

FIG. 3 is a high-level flowchart illustrating a method 200, according to some embodiments of the invention. The method stages may be carried out with respect to battery 100 described above, which may optionally be configured to implement method 200. Method 200 may comprise stages for producing, preparing and/or using battery 100, such as any of the following stages, irrespective of their order.

Method 200 comprises enclosing at least one lithium ion cell of a lithium ion battery in a transparent pouch configured to maintain an operative condition of the lithium ion battery (stage 210), and monitoring the lithium ion battery in the operative condition thereof (stage 220) e.g., during operation and/or testing. In certain embodiments, method 200 may comprise monitoring the lithium ion battery in the operative condition thereof by electromagnetic (e.g., optical) sensing of electromagnetic (e.g., optical) indications associated with cell components (stage 222), and managing operation of the lithium ion battery using the sensed electromagnetic indications (stage 225). The electromagnetic indications may be sensed and transmitted in various ways. Sensing may be carried out by any of: direct contact to respective cell components, indirect association such as materials that may change color upon binding to or reacting with specified compounds, and/or by remote sensing of cell components.

In certain embodiments, sensing of electromagnetic indications may be carried out through a portion or window in the pouch of the cell or battery, which may be configured to be at least partly transparent within at least one range of electromagnetic radiation. The whole of the pouch or parts thereof may be transparent, and optionally at least some of the transparent parts may be covered by a removable opaque cover that protects cell components from electromagnetic radiation.

Method 200 may further comprise covering, opaquely, the lithium ion battery during operation and exposing at least part of the lithium ion battery during monitoring, while maintaining the lithium ion battery in the operative condition (stage 230). In certain embodiments, method 200 may comprise covering the transparent pouch by an opaque cover while leaving at least one electromagnetic indicator in an uncovered window or tab of the transparent pouch (stage 232).

Method 200 may further comprise associating at least one electromagnetic indicator with at least one cell component inside the transparent pouch, with or without direct connection (stage 240), and the at least one electromagnetic indicator may be configured to indicate a condition of the respective at least one cell component (stage 245). The indicator(s) may be localized and/or spread throughout at least part of the transparent pouch.

In certain embodiments, cell parameters, relating to any of its components, may be sensed directly, through the transparent pouch and possibly through the cover (stage 247), e.g., using any of a range of methods such as FTIR (Fourier-transform infrared spectroscopy), cameras using CCD (charge-coupled device), CMOS (complementary metal-oxide-semiconductor) or other technologies, optical microscopy, confocal microscopy, interferometry, holography, X-ray, ellipsometry, speckle and Moire techniques, as well as various technologies implementing optical fibers, possibly with enhanced resolution. For example, FTIR may be used to measure cell components such as the electrodes and electrolyte solution in a direct manner, without or in addition to intermediate indicators. In certain embodiments, ellipsometry measurement may be used to measure parameters of the electrodes such as composition and width of the electrodes, through the transparent pouch. Direct sensing 247 may be applied to any part of the transparent pouch (e.g., through a transparent window) to sense therethrough and derive corresponding data, which can then be used to derive various operation characteristics of the battery. Direct electromagnetic (e.g., optical) sensing may be used in addition to or in place of sensing the indicators. Method 200 may further comprise configuring the materials and structure of the transparent pouch to enable direct sensing in specified wavelength range(s) that are appropriate for direct sensing 247 (stage 248), as explained above. In certain embodiments, direct sensing 247 may be implemented by providing transparent see-through windows and/or holes in the cell pouch, possibly in continuation to corresponding holes in the electrodes, for sensing deep cell components (stage 249).

Method 200 may comprise indicating lithium metallization on an anode of the at least one lithium ion cell by the at least one electromagnetic (e.g., optical) indicator (stage 250) and/or indicating remaining lifetime of the lithium ion battery by the at least one electromagnetic indicator (stage 255).

In certain embodiments, method 200 may comprise sensing, within the transparent pouch, at least one operational characteristic of the at least one lithium ion cell (stage 260), e.g., implementing piezoelectric sensing, and transmitting the sensed at least one operational characteristic outside the pouch, to enhance the monitoring (stage 265).

In certain embodiments, method 200 may further comprise establishing bidirectional electromagnetic (e.g., optical) communication to and from the at least one lithium ion cell in the transparent pouch (stage 270).

In certain embodiments, method 200 may comprise modifying operational conditions of the at least one lithium ion cell within the transparent pouch according to incoming electromagnetic (e.g., optical) communication (stage 280), for example, modifying 280 may comprise releasing or absorbing ions and/or enhancing or reducing lithiation inside the transparent pouch (stage 282) and/or disconnecting or impeding operation of the at least one lithium ion cell upon detected hazardous conditions (stage 284).

FIG. 4 is a high-level schematic illustration of various anode configurations, according to some embodiments of the invention. Embodiments of cells 115 enable fast charging rates with enhanced safety due to much reduced probability of metallization of lithium on the anode, preventing dendrite growth and related risks of fire or explosion. Anode material particles may have buffering zones for partly reducing and gradually introducing lithium ions into the anode for lithiation, to prevent lithium ion accumulation at the anode electrolyte interface and consequent metallization and dendrite growth. The electrolyte in the cell may be chosen to further reduce the accumulation rate of lithium ions at the interface, while maintaining the lithiation in the anode material is the rate limiting factor.

FIG. 4 illustrates schematically, in a non-limiting manner, a surface of anode 80A, which may comprise anode active material particles 140 (e.g., particles of metalloids such as silicon, germanium and/or tin, and/or of aluminum), and/or possibly composite core-shell particles 145, at different sizes (e.g., in the order of magnitude of 100 nm, e.g., 100-500 nm, and/or possible in the order of magnitude of 10 nm or 1 μ)—for receiving lithiated lithium during charging and releasing lithium ions during discharging. Anodes 80A may further comprise binder(s) and additive(s) 132 as well as optionally coatings 160 (e.g., conductive polymers 160A with or without lithium, conductive fibers 160B (not shown in the figure) such as CNTs (carbon nanotubes) or carbon fibers). Active material particles 140 may be pre-coated by one or more coatings 150 (e.g., by conductive polymers, lithium polymers, etc.), have borate and/or phosphate salt(s) 128 bond to their surface (possibly forming e.g., $B_2O_3$, $P_2O_5$), bonding molecules 180 (illustrated schematically) which may interact with electrolyte 90 (and/or ionic liquid additives thereto) and/or various nanoparticles 142 (e.g., $B_4C$, WC, VC, TiN) (forming modified anode active material particles 140A), may be attached thereto in anode preparation processes 135 such as ball milling (see, e.g., U.S. Pat. No. 9,406,927, which is incorporated herein by reference in its entirety), slurry formation, spreading of the slurry and drying the spread slurry. For example, anode preparation processes 135 may comprise mixing additive(s) 132, such as e.g., binder(s) (e.g., polyvinylidene fluoride, PVDF, styrene butadiene rubber, SBR, or any other binder), plasticizer(s) and/or conductive filler(s) with a solvent, such as water or organic solvent(s) (in which the anode materials have limited solubility), to make an anode slurry which is then dried, consolidated and is positioned in contact with a current collector (e.g., a metal, such as aluminum or copper). Details for some of these possible configurations are disclosed below.

It is explicitly noted that in certain embodiments, cathodes may be prepared according to disclosed embodiments, and the use of the term anode is not limiting the scope of the invention. Any mention of the term anode may be replaced in some embodiments with the terms electrode and/or cathode, and corresponding cell elements may be provided in certain embodiments. For example, in cells 115 configured to provide both fast charging and fast discharging, one or both electrodes 80A, 80B may be prepared according to embodiments of the disclosed invention.

Anode material particles 140, 140A, 145, anodes 80A and cells 115 may be configured according to the disclosed principles to enable high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1C denoting charging and/or discharging the cell in an hour, and XC (e.g., 5 C, 10 C, 50 C etc.) denoting charging and/or discharging the cell in 1/X of an hour—with respect to a given capacity of the cell.

In certain embodiments, anode 80A may comprise conductive fibers 160B which may extend throughout anode 80A (illustrated, in a non-limiting manner, only at a section of anode 80A) interconnect cores 140 and interconnected among themselves. Electronic conductivity may be enhanced by any of the following: binder and additives 132, coatings 160A, conductive fibers 160B, nanoparticles 142 and pre-coatings 150, which may be in contact with electronic conductive material (e.g., fibers) 160.

Lithium ion cell 115 comprises anode(s) 80A (in any of its configurations disclosed herein) made of anode material with composite anode material such as any of anode material particles 140, 140A, 145, electrolyte 90 and at least cathode 80B delivering lithium ions during charging through cell separator 86 to anode 80A. Lithium ions ($Li^+$) are lithiated (to $Li^{-01}$, indicating substantially non-charged lithium, in lithiation state) when penetrating the anode material, e.g., into anode active material cores 140 (possibly of core-shell particles 145). Any of the configurations of composite anode material and core-shell particles 145 presented below may be used in anode 80A, as particles 145 are illustrated in a generic, non-limiting way. In core-shell particle configurations 145, the shell may be at least partly be provided by coating(s) 150, and may be configured to provide a gap 170 for anode active material 140 to expand upon lithiation. In some embodiments, gap 170 may be implemented by an elastic or plastic filling material and/or by the flexibility of coating(s) 150 which may extend as anode active material cores 140 expands and thereby effective provide room for expansion, in a non-limiting manner as gap 170. Examples for both types of gaps 170 are provided below, and may be combined, e.g., by providing small gap 170 and enabling further place for expansion by the coating flexibility.

Any of the disclosed embodiments may be implemented in lithium ion batteries to improve their cycle life, charging/discharging rates, safety and/or capacity—and/or to track the modifications resulting from any of: running procedures, ambient conditions or changes thereof, storage conditions or changes thereof etc. Lithium ion batteries typically comprise anodes and cathodes with current collectors affixed thereto, packed with electrolyte and separator(s) in a soft or/and hard package (e.g., pouches, prismatic or cylindrical packages, etc. Anodes 80A may be made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. In certain embodiments, polymerization of coating and/or of coatings of the anode material particles may be controlled, as disclosed, e.g., in any of U.S. Patent Publication No. 2019/0198912 and 2019/0198912 incorporated herein by reference in their entirety. For example, anodes may be based on carbon (e.g., graphite, graphene or other carbon-based materials), metalloid anode material such as Si, Ge, Sn and their combinations and/or metals such as Li-metal.

Cathodes 80B may comprise lithium metal oxide (LiMeO), wherein Me can be one or several metals selected from Ni, Co, Fe, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc.

In disclosed embodiments, electrolytes 90 may be based on liquid electrolytes, typically linear and cyclic carbonates, such as EC (ethylene carbonate), DC (diethyl carbonate), PC (propylene carbonate), VC (vinylene carbonate), FEC (fluoroethylene carbonate), DEC (diethyl carbonate), EB (ethyl butyrate), BA (butyl acetate), EA (ethyl acetate), EMC (ethyl methyl carbonate), DMC (dimethyl carbonate) and combinations thereof.

In various embodiments, electrolyte 90 may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolyte 90 may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Publication No. 2019/0148774, incorporated herein by reference in its entirety.

Separator(s) 86 may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

The different configurations are illustrated schematically in different regions of the anode surface, yet embodiments may comprise any combinations of these configurations as well as any extent of anode surface with any of the disclosed configurations. Anode(s) 80A may then be integrated in cells 115 which may be part of lithium ion batteries, together with corresponding cathode(s) 80B, electrolyte 90 and separator 86, as well as other battery components (e.g., current collectors, electrolyte additives, battery pouch 110, contacts 82, and so forth).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A lithium ion battery comprising:
   at least one lithium ion cell comprising at least one anode and at least one cathode, separated by at least one separator,
   an at least partly transparent pouch that encloses the at least one lithium ion cell with electrolyte in an operative condition, wherein the pouch is at least partly transparent within at least one range of electromagnetic radiation,
   at least one first electromagnetic sensor outside the transparent pouch, configured to apply direct sensing through the transparent pouch, to receive data concerning a condition of at least one cell component,
   a battery management system (BMS) configured to manage operation of the lithium ion battery and be in communication with the at least one first electromagnetic sensor;
   at least one electromagnetic transmitter outside the transparent pouch and associated with the BMS, and
   at least one second electromagnetic sensor positioned inside the transparent pouch, configured to receive electromagnetic signals from the at least one electromagnetic transmitter and change operational conditions of the at least one lithium ion cell within the transparent pouch.

2. The lithium ion battery of claim 1, wherein the at least one first electromagnetic sensor comprises at least one of: FTIR (Fourier-transform infrared spectroscopy), cameras using CCD (charge-coupled device), CMOS (complementary metal-oxide-semiconductor), optical microscopy, confocal microscopy, interferometry, ellipsometry, holography, speckle techniques, Moire techniques and optical fiber sensors.

3. The lithium ion battery of claim 1, wherein the at least partly transparent pouch comprises transparent see-through windows and/or holes in the cell pouch.

4. The lithium ion battery of claim 3, wherein the at least one anode and/or the at least one cathode comprises holes that are continuous to the transparent see-through windows and/or holes in the cell pouch, configured to enable direct sensing of internal cell components.

5. A lithium ion battery comprising:
at least one lithium ion cell comprising at least one anode and at least one cathode, separated by at least one separator,
a transparent pouch that encloses the at least one lithium ion cell with electrolyte in an operative condition, wherein the pouch is at least partly transparent within at least one range of electromagnetic radiation,
at least one indicator associated with at least one cell component inside the transparent pouch and configured to indicate a condition of the respective at least one cell component by an electromagnetic signal,
at least one first electromagnetic sensor outside the transparent pouch, configured to receive the electromagnetic signal from the at least one indicator,
a battery management system (BMS) configured to manage operation of the lithium ion battery and be in communication with the at least one first electromagnetic sensor;
at least one electromagnetic transmitter outside the transparent pouch and associated with the BMS, and
at least one second electromagnetic sensor positioned inside the transparent pouch, configured to receive electromagnetic signals from the at least one transmitter and change operational conditions of the at least one lithium ion cell within the transparent pouch.

6. The lithium ion battery of claim 5, wherein the transparent pouch is at least partly transparent only within a specified window region thereof that covers the at least one indicator.

7. The lithium ion battery of claim 5, further comprising an opaque cover covering the transparent pouch, wherein the at least one indicator is positioned in an uncovered window or tab of the transparent pouch.

8. The lithium ion battery of claim 5, further comprising at least one sensor within the transparent pouch that is configured to sense at least one operational characteristic of the at least one lithium ion cell within the transparent pouch and transmit the sensed at least one operational characteristic to the BMS.

9. The lithium ion battery of claim 5, wherein the at least one second electromagnetic sensor is associated with at least one actuator inside the transparent pouch, that is configured to change at least one of: release or absorb ions, enhance or reduce lithiation of the at least one anode and/or the at least one cathode inside the transparent pouch.

10. The lithium ion battery of claim 5, wherein the at least one second electromagnetic sensor is associated with at least one actuator inside the transparent pouch, that is configured to disconnect or impede.

11. The lithium ion battery of claim 8 wherein the at least one sensor is a piezoelectric sensor.

* * * * *